(12) United States Patent
Torii et al.

(10) Patent No.: US 7,472,680 B2
(45) Date of Patent: Jan. 6, 2009

(54) VORTEX GENERATOR WITH SUB-APERTURE AND METHOD OF MANUFACTURING THE SAME

(75) Inventors: Katsuya Torii, Anjo (JP); Masamichi Akagawa, Kariya (JP)

(73) Assignee: Denso Corporation (JP)

( * ) Notice: Subject to any disclaimer, the term of this patent is extended or adjusted under 35 U.S.C. 154(b) by 72 days.

(21) Appl. No.: 11/700,890

(22) Filed: Feb. 1, 2007

(65) Prior Publication Data

US 2007/0181097 A1 Aug. 9, 2007

(30) Foreign Application Priority Data

Feb. 8, 2006 (JP) ............... 2006-030702

(51) Int. Cl.
*F02B 31/06* (2006.01)
*F02D 9/10* (2006.01)

(52) U.S. Cl. ...................... 123/306; 123/337

(58) Field of Classification Search ............ 123/188.14, 123/306, 337, 403, 590; 251/304, 305
See application file for complete search history.

(56) References Cited

U.S. PATENT DOCUMENTS 5,806,484 A * 9/1998 Yoneyama et al. .......... 123/337
5,979,401 A * 11/1999 Hickey ........................ 123/306
6,827,060 B2 * 12/2004 Huh ............................ 123/306
6,863,049 B1 * 3/2005 Hausknecht ................. 123/337
6,971,632 B2 * 12/2005 Elliot et al. .................. 251/305
2003/0070654 A1 * 4/2003 Ha ............................. 123/306

FOREIGN PATENT DOCUMENTS

JP 2003-293775 10/2003

* cited by examiner

*Primary Examiner*—Willis R Wolfe, Jr.
(74) *Attorney, Agent, or Firm*—Nixon & Vanderhye PC

(57) ABSTRACT

A vortex generator is disclosed for flow of a fluid. The vortex generator includes a housing that includes a passage through which the fluid flows. The vortex generator also includes a valve that is movably coupled to the housing between a fully closed position and a fully open position for changing flow of the fluid in the passage. The valve includes an open portion that defines a main aperture for generating a vortex in the flow of the fluid. Also, the valve has an intermediate position between the fully closed position and the fully open position. The housing further includes a recessed portion such that the recessed portion of the housing and the valve cooperate to define a sub-aperture through which the fluid flows when the valve is positioned in the intermediate position. A method of manufacturing the vortex generator is also disclosed.

22 Claims, 6 Drawing Sheets

VORTEX GENERATOR WITH SUB-APERTURE AND METHOD OF MANUFACTURING THE SAME

CROSS REFERENCE TO RELATED APPLICATION

The following relates to and claims priority to Japanese Patent Application No. 2006-30702, filed Feb. 8, 2006, which is hereby incorporated by reference in its entirety.

FIELD

The following relates, generally, to a vortex generator and, more specifically, to a vortex generator with a sub-aperture.

BACKGROUND

It is known to provide a vortex generator capable of creating a vortex of fluid flowing therethrough. For instance, it is known to provide an intake vortex generator in a vehicle air intake system for creating a vortex of intake air flowing into a combustion chamber of an internal combustion engine (e.g., when the engine is started or when the engine idles) to improve combustion efficiency and reduce fuel consumption and the like. (See, e.g., JP-A-2003-293775, pages 1-5, FIGS. 1 to 6.) Such an intake vortex generator is provided with a housing 102 and a flow control valve 105 as shown in FIGS. 7, 8A and 8B. The housing 102 constitutes an intake manifold for the intake of air into a combustion chamber 101 of the internal combustion engine. The intake flow control valve 105 has a valve shaft 103 constituting the center of rotation and that rotates relative to the housing 102 to open and close an intake passage 104 in the housing 102.

The internal combustion engine is provided with a cylinder head 106 coupled to the housing 102, and a cylinder block 107 having a cylinder bore formed therein. The cylinder head 106 includes an electromagnetic fuel injection valve 111, (i.e., injector) that injects fuel, an intake valve 113 that opens and closes an intake port 112, and an exhaust valve 115 that opens and closes an exhaust port 114. The cylinder bore of the cylinder block 107 receives a piston 116 sliding therein.

As shown in FIG. 8A, the control valve 105 is generally flat and includes a pair of partitions 121 formed at two ends of the upper end thereof. A main aperture 122 is defined between the partitions 121 to allow the passage of the intake air when the intake flow control valve 105 is placed in the fully closed position (shown in solid lines in FIG. 8B). Also, four sub-apertures 123 are included in the control valve 105 at the edges thereof and adjacent the valve shaft 103. The sub-apertures 123 each have a smaller area than the main aperture 122.

The main aperture 122 can cause occurrence of a liquid pool of fuel (i.e., residual gasoline) near the intake flow control valve 105 as shown in FIG. 7. If the fuel in the liquid pool flows into the combustion chamber 101 (e.g., when the vehicle is on an incline), combustion can be incomplete and the engine can malfunction.

In partial response to this problem, for the intake vortex generator disclosed in JP-A-2003-293775, when the internal combustion engine is cooled and the amount of intake air flow is small, the intake flow control valve 105 is placed in the fully closed position such that a tumble flow is created in the combustion chamber 101. Thereupon, in addition to the main intake flow passing through the main aperture 122, intake sub-flows occur through the sub-apertures 123 of the intake flow control valve 105 so as to counter a return flow of a portion of the main intake flow. Thus, it is less likely that the liquid pool will collect near the intake flow control valve 105.

Typically, at the starting of the internal combustion engine, during idling, and/or at low engine speeds the intake flow control valve 105 is fully closed to cause the main, intake flow through the main aperture 122 into the combustion chamber 101, whereby a tumble flow is generated in the combustion chamber 101 to increase the combustion efficiency in the combustion chamber 101 and to improve fuel consumption. Then, during other running conditions of the engine, the intake flow control valve 105 is fully opened (shown in phantom in FIG. 8B) to allow the intake air to flow directly and to stop tumble flow.

In some operating conditions of the engine (e.g., at low engine speeds), the intake flow control valve 105 is positioned in an intermediate position between the fully open and fully closed position. As a result, a tumble flow is generated during an increase in the amount of intake air flowing into the combustion engine 101 to a certain extent. However, when the valve 105 is positioned in the intermediate position, the respective axes of the sub-apertures 123 are not aligned with the flow direction of the intake air. Accordingly, the flow rate of the sub-intake flowing through the sub-apertures 123 into the intake port 112 is decreased. This causes a reduction in velocity of the sub-intake flow such that return flow of the main intake flow is more likely. As a result, a liquid pool of fuel is more likely to develop near the intake flow control valve 105.

Furthermore, the main aperture 122 and the four sub-apertures 123 are typically formed by cutting operations. Then, the two ends of the valve shaft 103 in the axis direction are rotatably attached to the housing 102. Next, the intake flow control valve 105 is inserted into an inserting hole of the valve shaft 103 so that the intake flow control valve 105 is coupled to the housing 102 and the valve shaft 103. This manufacturing process can be time consuming and relatively expensive.

Moreover, when the intake flow control valve 105 is in the fully closed position, the valve 105 can experience an impact load during operation (e.g., from excessive pressure such as depression at the engine manifold or from an irregular pressure incidental to abnormal combustion such as in a back fire). As such, stress can concentrate adjacent the main aperture 122 and the four sub-apertures 123, thus decreasing the operating life of the intake flow control valve 105. In partial response to this problem, the intake flow control valve 105 can be increased in thickness to improve the strength thereof. However, this causes an increase in size and weight of the intake vortex generator. Also, to improve the strength of the valve 105, the valve 105 can be made of high-strength material. However, this further increases the cost of the intake flow control valve 105.

SUMMARY

A vortex generator is disclosed for flow of a fluid. The vortex generator includes a housing that includes a passage through which the fluid flows. The vortex generator also includes a valve that is movably coupled to the housing between a fully closed position and a fully open position for changing flow of the fluid in the passage. The valve includes an open portion that defines a main aperture for generating a vortex in the flow of the fluid. Also, the valve has an intermediate position between the fully closed position and the fully open position. The housing further includes a recessed portion such that the recessed portion of the housing and the valve cooperate to define a sub-aperture through which the fluid flows when the valve is positioned in the intermediate position.

A method of manufacturing a vortex generator is also disclosed for flow of a fluid. The method includes simultaneously molding a housing and a valve in a molding die. The housing includes a passage through which the fluid flows, and the passage has an axis. The valve is movably coupled to the housing between a fully closed position and a fully open position for changing flow of the fluid in the passage. The valve includes an open portion that defines a main aperture for generating a vortex in the flow of the fluid. The valve also has an intermediate position between the fully closed position and the fully open position. The housing further includes a recessed portion such that the recessed portion of the housing and the valve cooperate to define a sub-aperture through which the fluid flows when the valve is positioned in the intermediate position. Furthermore, the molding die is moved in a direction approximately parallel to the axis of the passage to remove the housing and the valve from the molding die.

BRIEF DESCRIPTION OF THE DRAWINGS

Other objects, features, and advantages of the present disclosure will become more apparent from the following detailed description made with reference to the accompanying drawings, in which like parts are designated by like reference numbers and in which.

DETAILED DESCRIPTION

First Embodiment

Figure 1A:
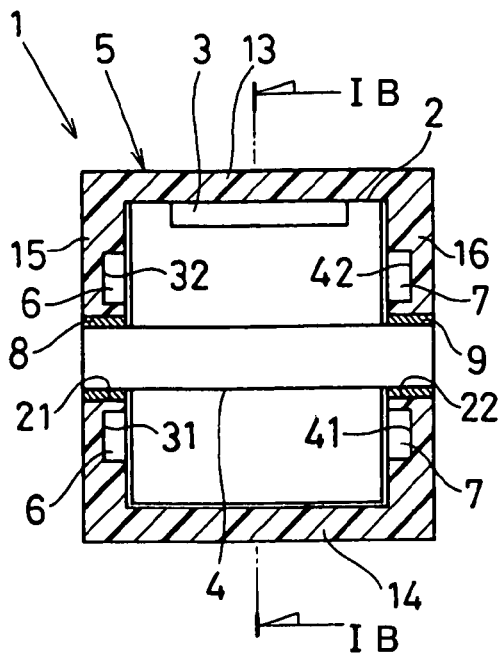
FIG. 1A is a sectional front view of a vortex generator according to a first embodiment of the present disclosure.
Figure 1B:
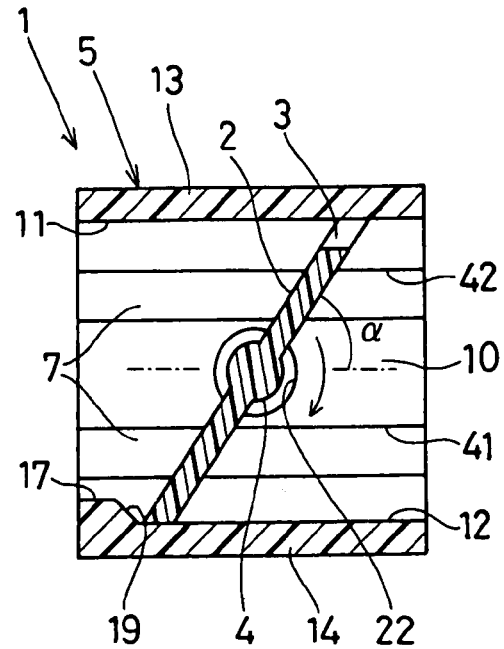
FIG. 1B is a sectional side view taken along the IB-IB line of FIG. 1A.
Figure 1C:
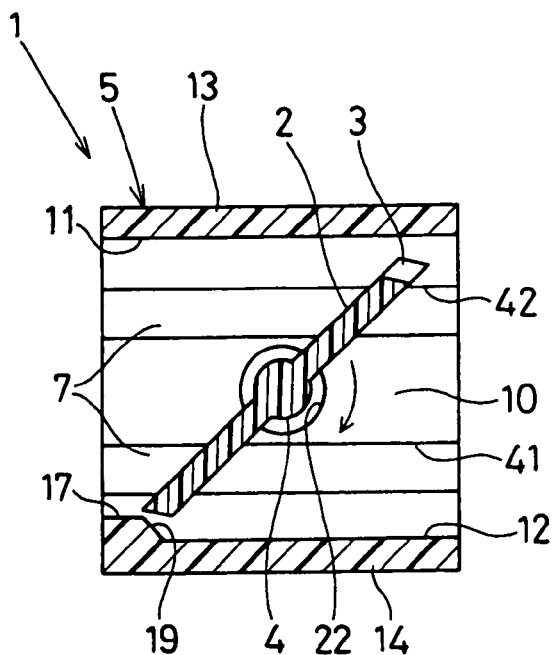
FIG. 1C is a sectional side view of the vortex generator of FIG. 1A with a valve shown in an intermediate position.

FIGS. 1A to 1C illustrate a first embodiment of a vortex generator according to the present disclosure. In the embodiment shown, the vortex generator is an intake vortex generator for creating a vortex in a fluid (i.e., air) flowing therethrough and into a combustion chamber of an vehicle engine. However, it will be appreciated that the vortex generator could be employed in any other suitable device without departing from the scope of the present disclosure.

The intake system for an internal combustion engine of the first embodiment is equipped with an intake vortex generator which is capable of generating a vertical intake vortex (i.e., tumble flow) in the air flowing therethrough. The vortex promotes the combustion of an air-fuel mixture in each cylinder of a multi-cylinder internal combustion engine (e.g., a four-cylinder gasoline engine, hereinafter referred to as "engine" or "engine body").

The engine produces an output resulting from thermal energy produced by the combustion of a mixture of intake air and fuel in the combustion chambers, and is provided with an intake duct (engine inlet pipe) for feeding intake air (intake) into each of the combustion chambers of the cylinders of the engine body, and an exhaust duct (engine exhaust pipe) for discharging the exhausted gas flowing from the combustion chamber in each cylinder of the engine body through an exhaust emission purifier to the outside. The engine body is provided with a cylinder head (not shown) hermetically joined to the downstream end of the intake duct, and a cylinder block (not shown) internally defining the combustion chambers into which the air-fuel mixture is fed from three-dimensional intake passage-shaped intake ports provided in the cylinder head.

Spark plugs (not shown) are mounted in the cylinder head, and each have a leading end protruding into the combustion chamber in each cylinder. Injectors (i.e., internal-combustion-engine fuel injection valves, electromagnetic fuel injection valves, not shown) are mounted in the cylinder head and each inject fuel into the intake port at optimum timing. A plurality of intake ports formed in one side of the cylinder head are closed and opened by a poppet intake valve, and corresponding exhaust ports are formed in the other side of the cylinder head. The exhaust ports are closed and opened by a corresponding poppet exhaust valve.

The intake duct has an air cleaner case holding an air cleaner (filter element) filtering the intake air, a throttle body joined thereto downstream from the air cleaner case in the flowing direction of the intake air, a surge tank joined thereto downstream from the throttle body in the flowing direction of the intake air, an intake manifold joined thereto downstream from the surge tank in the flowing direction of the intake air, and the like. The intake manifold is provided for distributing the intake air flowing therein among the intake ports provided in the cylinder head of the engine in correspondence with the respective cylinders. The intake manifold is molded in one piece from a resin material (e.g., a glass-fiber reinforced thermoplastic resin) for the purpose of reduction in weight and cost.

The intake vortex generator includes a valve unit 1 with a passage 10. The passage 10 is in fluid communication with a corresponding cylinder (combustion chamber) of the engine. The valve unit 1 is provided with a tumble flow control valve 2 (TCV, hereinafter referred to as "intake flow control valve"), a housing 5 and a valve drive device. The passage 10 extends through the housing 5 and has a linear axis in the embodiment shown. The intake air flows through the passage 10 and into the corresponding combustion chamber.

The valve 2 is movably coupled to the housing 5 and is provided in the passage. In the embodiment shown, the valve 2 is rotatably coupled to the housing, and by rotating, the valve changes flow characteristics of the intake air. Also, the intake flow control valve 2 generates a vortex (tumble) of the intake air fed into the combustion chamber of the engine.

The valve unit 1 of the intake vortex generator also includes a valve shaft 4 that rotatationally couples the housing 5 and the valve 2. The valve drive device drives rotation of the intake flow control valve 2 between a fully closed position (shown in FIGS. 1A and 1B) and a fully open position described below. The valve drive device also drives rotation of the intake flow control valve 2 to an intermediate position between the fully closed position and the fully open position (shown in FIG. 1C).

In one embodiment, the valve drive device is a motorized actuator provided with a power unit which includes an electrically-operated motor and generates a driving force (motor output shaft torque) and a power transmission mechanism (gear reduction mechanism in the first embodiment) for transferring the rotational motion of the motor shaft (output shaft) of the electrically-operated motor to the valve shaft. In one embodiment, the electrically-operated motor is a direct-current (DC) motor such as a brushless DC motor or a brush DC motor. An alternate current (AC) motor such as a three-phase induction motor may also be included. The gear reduction mechanism is provided for reducing the rotational speed of the motor shaft of the electrically-operated motor to achieve a predetermined reduction gear ratio, and constitutes a power transmission mechanism transmitting the motor output shaft torque to the valve shaft.

The valve drive device, particularly, the electrically-operated motor is structured so that the passage of electric current therethrough is controlled by an engine control unit (hereinafter referred to as "ECU"). The ECU variably controls the electric power applied to the electrically-operated motor in accordance with the operational state of the engine (e.g., the engine speed, the throttle opening, the amount of depression of the accelerator pedal, the target amount of intake, and the like) for control of the valve position (valve opening) of the intake flow control valve 2 over the full valve operating range including from the fully closed position, the intermediate position, and the fully open position.

In this embodiment, the fully closed position of the intake flow control valve 2 is a valve position (valve opening) in which the gap between the intake flow control valve 2 and the housing 5 is at a minimum (i.e., the flow rate of intake air (the amount of intake) flowing through the intake passage 10 is minimized). The fully open position of the intake flow control valve 2 is a valve position (valve opening) in which the gap between the intake flow control valve 2 and the housing 5 is maximized (i.e., the flow rate of intake air (the amount of intake) flowing through the inside of the intake passage 10 is maximized). The intermediate position of the intake flow control valve 2 corresponds to an intermediate valve opening at which the intake flow control valve 2 moves at a predetermined angle of rotation relative to the axis of the passage 10 (e.g., 5 degrees to 45 degrees) from the fully closed position.

The intake flow control valve 2 is integrally molded in a predetermined shape from a resin material (e.g., a glass fiber reinforced thermoplastic resin). The intake flow control valve 2 includes a square (or rectangular) plate-shaped valve body that rotates about the shaft 4 relative to the housing 5 to change the opening area of the intake passage 10. The plate-shaped valve body has first and second faces (i.e., flat faces, right and left valve end faces) located at opposite horizontal sides in FIG. 1A, and first and second sides (i.e., top and bottom ends) located at opposite vertical sides in FIG. 1A.

The intake flow control valve 2 blocks off/opens the intake passage 10 by being changed, continuously or in stages, in the angle of rotation (valve opening) over the valve operating range from the fully closed position, to the intermediate position and then to the fully open position. The intake flow control valve 2 is biased toward the fully closed position by a valve-biasing member such as a coil spring (not shown).

As shown in FIG. 1A, the intake flow control valve 2 includes an open portion 3 at a top valve end face thereof. In the embodiment shown, the open portion 3 is rectangular in shape. The open portion 3 and an inside surface of the housing 5 cooperate to define a main aperture for generating the vortex in the flow of the intake air when the valve 2 is in the fully closed position.

The valve shaft 4 is integrally molded with and is provided approximately at a central portion of the valve 2 to define a rotational center thereof. That is, the intake flow control valve 2 is a double-ended valve (butterfly valve). The rotational axis of the valve 2 is approximately perpendicular to the axis of the passage 10.

The intake flow control valve 2 is fully closed when the engine is cool or the required amount of intake air is small, that is, when the engine is started or while the engine is idling. Specifically, in the fully closed position, the plane of the intake flow control valve 2 is inclined at a positive, acute angle, α, relative to the respect to the axis of the passage 10 (see FIG. 1B).

In the first embodiment, when a larger amount of intake air is required, that is, when the engine runs at low engine speeds, the intake flow control valve 2 is controlled to move to the intermediate valve opening as illustrated in FIG. 1C. When the engine runs at intermediate or high engine speeds, the intake flow control valve 2 is fully opened. Specifically, when the intake flow control valve 2 is in the fully open position, the intake flow control valve 2 is positioned such that the first and second faces of the valve 2 extend approximately parallel to the axis direction of the intake passage 10.

The cylindrical shaped valve shaft 4 is molded integrally with the intake flow control valve 2 close to the axis of rotation forming the rotational center of the intake flow control valve 2 and extends in the axis direction. The valve shaft 4 has a shaft hole (not shown) formed therein through which a valve shaft extends in the axis direction. When the intake flow control valve 2 and the housing 5 are simultaneously formed, the valve shaft 4 extends out from the two side faces of the intake flow control valve 2 in the axis direction to be rotatably held inside the housing 5. The two ends of the valve shaft 4 in the axis direction function as two sliding portions which are axially supported by and slide in the inner periphery of the housing 5 through two bearings 8, 9.

The entire housing 5 is molded in one piece in a rectangular shape from a resin material (e.g., a glass fiber reinforced thermoplastic resin) (integral molding of resin). As will be described in greater detail below, the housing 5 and the valve 2 are simultaneously molded in molding dies. The molding dies are moved in a direction approximately parallel to the axis of the passage to thereby remove the housing 5 and the valve 2 from the molding dies.

The intake passage 10 of the first embodiment is a rectangular-shaped fluid passage (air passage) with four interior surfaces, and connects via the intake port with the combustion chamber of the engine. The passage 10 has an entrance 11 through which air enters the passage 10, and an exit 12 through which air exits the passage 10. The entrance 11 of the housing 5 is hermetically connected to (communicates with) the downstream end of the intake passage formed in the surge tank or the intake passage formed in the upstream side of the intake manifold. The exit 12 of the housing 5 is hermetically connected to (communicates with) the upstream end of the intake port formed in the cylinder head of the engine body.

The housing 5 is constituted of two top and bottom walls (top wall 13 and bottom wall 14) and two right and left walls (side wall 15 and side wall 16). The valve 2 abuts the inner surface of the top wall 13 and the bottom wall 14 when the intake flow control valve 2 is fully closed in the fully closed position.

The bottom wall 14 has a protrusion 17 molded integrally therewith (integral molding of resin) near the entrance of the housing 5 and protruding toward the axis of the intake passage 10. A face 19 is formed on the end of the protrusion 17 adjacent the valve 2. The face 19 is curved along to the track of the rotational movement of the lower end face of the intake flow control valve 2. As such the lower end face of the intake flow control valve 2 is immediately adjacent the face 19 even as the valve 2 rotates between the fully closed position and the intermediate position. In the embodiment shown, the face 19 is substantially flat; however, the face 19 can have more substantial curvature. The face 19 helps to direct the flow of air in a predetermined manner (e.g., to ensure a predetermined tumble flow).

The two side walls 15, 16 respectively have bearing receiving holes 21, 22 formed therein for axially supporting, via the two bearings 8, 9, the ends of the valve shaft 4 of the intake flow control valve 2. The two bearings 8, 9 are fixed in the respective bearing receiving holes 21, 22 by, for example, press fitting.

Each of the two entire bearings 8, 9 is molded in one piece in a cylindrical shape from a resin material (e.g., thermoplastic resin) (integral molding of resin). The bearings 8, 9 respectively have sliding holes formed therein for receiving the two sliding portions of the valve shaft 4 so as to allow them to slide in the rotating direction.

The side wall 15 also include a plurality of recessed portions 31, 32, and the side wall 16 includes a plurality of recessed portions 41, 42. The recessed portions 31, 32, 41, 42 are included on the inner surface of the respective side wall 15, 16. As will be described below, the recessed portions 31, 32, 41, 42 of the housing 5 and the valve 2 cooperate to define a plurality of sub-apertures 6, 7 through which the air flows when the valve 2 is in the intermediate position. In the embodiment shown, the sub-apertures 6, 7 provide fluid communication between the upstream side of the valve 2 and the downstream side of the valve 2 such that air flows through the sub-apertures 6, 7 when the valve 2 is in the fully closed position and the intermediate position.

In the embodiment shown, the axis of the recessed portions 31, 32, 41, 42 is approximately parallel to the axis of the passage 10. As such, the molding dies used to simultaneously mold the housing 5 and the valve 2 can move approximately parallel to the axis of the passage 10 when removing the housing 5 and valve 2 from the dies.

It will be appreciated that the opening area of the plurality of sub-apertures 6, 7 may be smaller than that of the main aperture 3. The opening area of the plurality of sub-apertures 6, 7 may be greater than that of the main aperture 3. The opening area of the plurality of sub-apertures 6, 7 may be approximately equal to that of the main aperture 3.

The recessed portions 31, 32 of the side wall 15 of the housing 5 include a first and second parallel and straight recessed portions 31, 32 (i.e., grooves). The first and second recessed portions 31, 32 extend linearly from the entrance 11 of the housing 5 to the exit 12 of the housing 5. The recessed portions 41, 42 of the side wall 16 of the housing 5 also include a first and second parallel and straight recessed portions 41, 42 (i.e., grooves). The first and second recessed portions 41, 42 extend linearly from the entrance 11 of the housing 5 to the exit 12 of the housing 5.

The first recessed portions 31, 41 are located on one side of the valve shaft 4 (i.e., the bottom side), and the second recessed portions 32, 42 are located on an opposite side of the valve shaft 4 (i.e., the top side).

Next, a method of manufacturing an intake vortex generator (valve unit 1) of the first embodiment will be described with reference to FIGS. 1A, 1B and 1C.

With regard to heat-resisting properties and hardness, preferable examples of the thermoplastic resin used for the intake flow control valve 2, the valve shaft 4 and the housing 5 include a polyamide resin (PA), a unsaturated polyester resin (UP), poly(phenylene sulfide) (PPS), and poly(butylene terephthalate) (PBT).

Thermoplastic resin products such as the intake flow control valve 2, the valve shaft 4 and the housing 5 are molded by an injection molding method of heating pellets of resin material, then of applying pressure to the melted resin material to inject it into a forming die to form a resin molding, then of cooling it, and then of removing the set resin molding from the forming die.

The intake flow control valve 2, the valve shaft 4 and the housing 5 may be fabricated by the use of an injection molding method of simultaneously and integrally molding the intake flow control valve 2, the valve shaft 4 and the housing 5 from a thermoplastic resin in a single injection mold (forming die). In this case, the valve shaft 4 is formed in the intake flow control valve 2 such that the valve shaft 4 extends out from the right and left end faces of the intake flow control valve 2 in the axis direction and is rotatably received in the shaft receiving holes 21, 22 of the housing 5. In addition, the two first straight recessed portions 31, 41 and the two second straight recessed portions 32, 42 of the housing 5 are formed at the time of simultaneously molding the intake flow control valve 2, the valve shaft 4 and the housing 5.

After the intake flow control valve 2, the valve shaft 4 and the housing 5 have been simultaneously molded, the two bearings 8, 9 are respectively mounted on the inner peripheries of the shaft receiving holes 21, 22 in the two side walls 15, 16 of the housing 5 from the two axis-direction ends of the valve shaft 4 by the use of press-fitting or the like, resulting in the manufacture of the valve unit 1.

In consequence, the process of mounting the intake flow control valve 2 to the valve shaft 4 and the housing 5 is fairly simple, and the manufacturing costs can be reduced. Accordingly, the manufacturing costs of the intake vortex generator are reduced.

A preferable thermoplastic resin used for the bearings 8, 9 is a resin material having satisfactory sliding properties and satisfactory wear-resistant properties (e.g., a thermoplastic resin such as one comprising a polyamide resin (PA)). The two bearings 8, 9 may be integrally molded from a resin composite material resulting from mixing or adding, with or to a resin material, a low sliding resistant material (e.g., fluorine resin powder such as a polytetrafluoroethylene resin (PTFE)) for reducing the sliding resistance produced in the relative movement between the valve shaft 4 of the intake flow control valve 2 and the two bearings 8, 9.

Next, the operation of the intake vortex generator of the first embodiment will be described with reference to FIGS. 1A, 1B and 1C.

The ECU controls the electric power applied to the electrically-operated motor (e.g., energizes the electrically-operated motor) when the engine body heats up and requires a large amount of intake air, that is, when the engine is in a normal operation. At this point, the intake flow control valve 2 is opened by being driven in the direction opening the valve for operation by the driving force of the electrically-operated motor. In other words, the intake flow control valve 2 is controlled to be opened to the fully open position (full open mode).

In this case, the intake flow, which flows from the intake passage in the intake duct of the engine via the entrance 11 of the housing 5 into the intake passage 10 in the housing 5, passes directly through the intake passage 10 and then is introduced from the exit 12 of the housing 5 into the intake port provided in the cylinder head of the engine body. Further, the intake flow passing through the intake port is fed from the intake valve port of the intake port into the combustion chamber. In this configuration, a vertical intake vortex (tumble) flow is not intended.

On the other hand, when the engine body is cool and requires a small amount of intake air, that is, when the engine is started or is idling, the ECU controls the electric power applied to the electrically-operated motor (e.g., stops the passage of electric power through the electrically-operated motor). At this point, the intake flow control valve 2 is closed by abutting against the top wall 13 and the bottom wall 14 of the housing 5 due to the biasing force of the coil spring. In short, as illustrated in FIGS. 1A and 1B, the intake flow control valve 2 is controlled to be closed in the fully closed position (complete closure mode).

In this case, the intake flow, which flows from the intake passage in the intake duct of the engine via the entrance 11 of the housing 5 into the intake passage 10 in the housing 5, passes almost fully through only the main aperture 3 and then is introduced from the exit 12 of the housing 5 into an upper portion of the intake port so as to flow along the wall face of the upper portion of the intake port. The intake flow flowing along the top wall face of the upper portion of the intake port is fed from the intake valve port of the intake port into the combustion chamber. At this point, a vertical intake vortex (tumble) is produced in the combustion chamber. Because of this, the combustion efficiency in the combustion chamber when the engine is started or is idling is increased, resulting in the improvement in fuel consumption, exhaust emission and the like.

As such, the intake flow (main intake flow) passing through between the top end face of the intake flow control valve 2 and the top wall face of the top wall 13 of the housing 5, particularly through the main aperture 3, is returned in the intake port to produce return air. Such return air causes the fuel emitted from the injector to flow along the side-wall inner-face of the intake port in the upstream direction of the intake flow. Then, the fuel collects near the intake flow control valve 2 to form a liquid pool (residual gasoline). As a result, for example, when the intake flow control valve 2 is fully opened, the fuel flows into the combustion chamber in a rush, conventionally resulting in occurrence of incomplete combustion.

To avoid this, in the intake vortex generator of the first embodiment, the first and second recessed portions 31, 32, 41, 42 are provided in order to form the plurality of sub-apertures 6, 7. Accordingly, as shown in FIGS. 1A and 1B, when the intake flow control valve 2 is closed in the fully closed position, in addition to the intake air flow (main intake flow) passing through the main aperture 3 to be introduced into the intake port, another intake air flow (sub-intake flow) passing through the sub-apertures 6, 7 is introduced into the intake port.

Thus, the sub-intake flow after having passed through the plurality of sub-apertures 6, 7 flows along the side-wall inner-face of the intake port in the downstream direction of the intake flow. Specifically, because the sub-intake flow flows so as to counter the return air flow of the main intake flow, the fuel, which is about to be caused to flow along the side-wall inner-face of the intake port in the upstream direction of the intake flow, is pushed back in the downstream direction of the intake flow, thus avoiding occurrence of fuel collecting near the intake flow control valve 2.

Also, at low engine speeds, when the generation of a tumble flow is required because a larger amount of intake air is required, the ECU controls the electric power applied to the electrically-operated motor. For example, by passing electric power through the electrically-operated motor, the intake flow control valve 2 is controlled to come into the mode of intermediate valve opening in which it moves from the fully closed position to slightly (partially) open in the valve-opening operating direction (to the intermediate position). As a result, a tumble flow occurs while the amount of intake air fed into the combustion chamber of the engine is being increased to a certain degree. Therefore, the combustion efficiency in the combustion chamber when the engine runs at low rpm is increased, resulting in improvements in fuel consumption, exhaust emission and the like.

Figure 7:
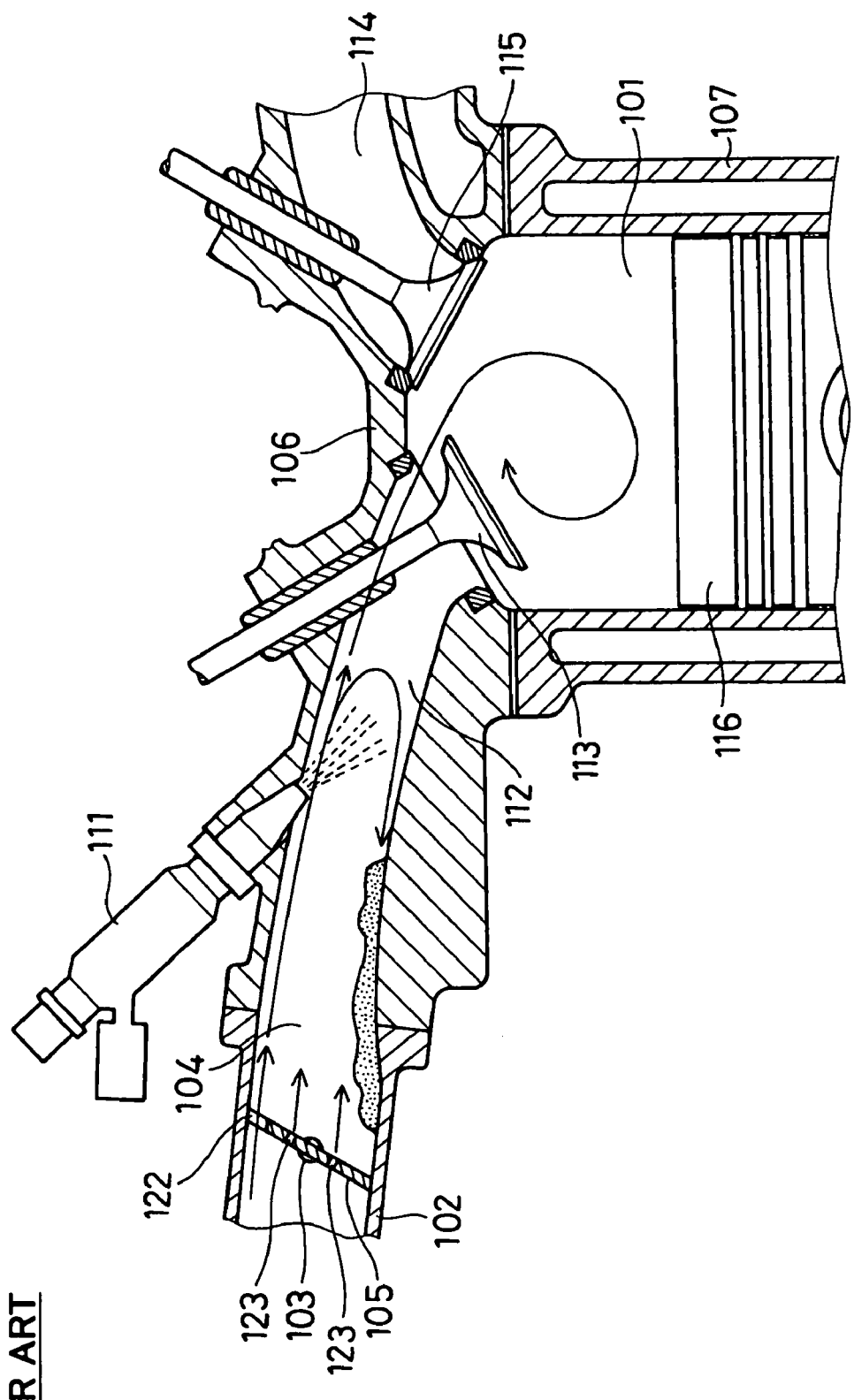
FIG. 7 is a sectional view of a vehicle engine with a vortex generator of the prior art.
Figure 8A:
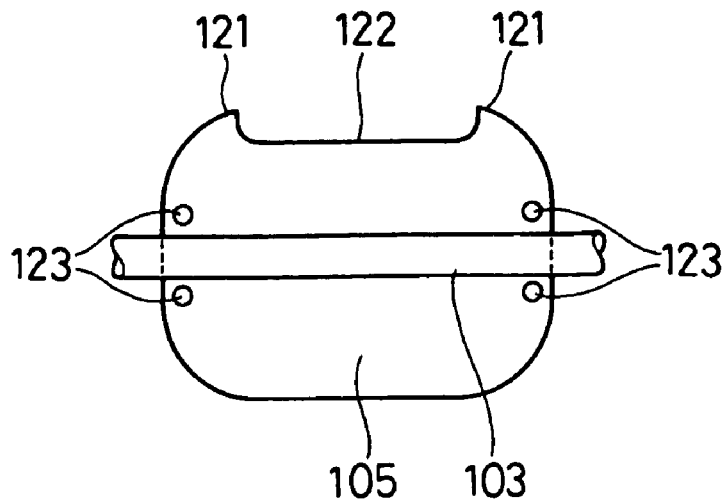
FIG. 8A is a front view of a flow control valve of a vortex generator of the prior art.
Figure 8B:
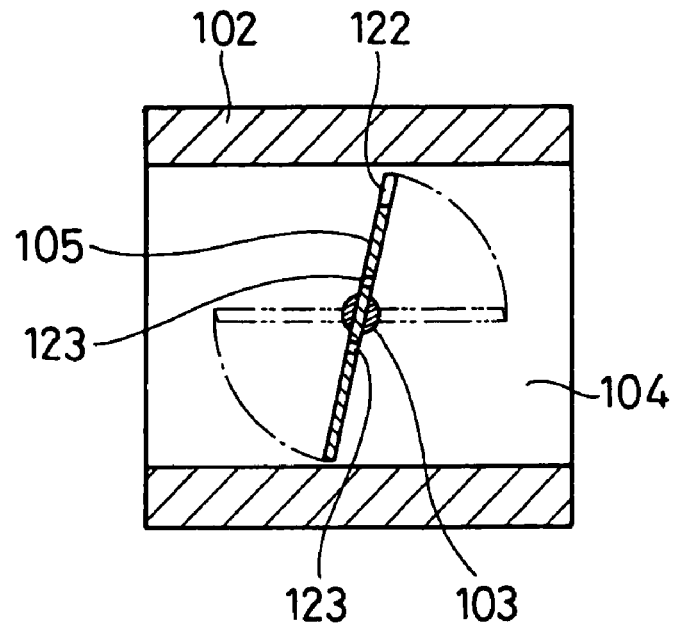
FIG. 8B is a sectional side view of a vortex generator of the prior art.

In the intake vortex generator described in JP-A-2003-293775 and illustrated in FIGS. 7-8B, when the valve 105 is in the intermediate position, the axes of the sub-apertures 123 are at a positive, acute angle with respect to the axis of the passage, thus decreasing the intensity of the sub-intake flow. As a result, the effect of countering the return air flow is reduced, thus making formation of a liquid pool of fuel more likely.

In contrast, in the embodiment shown in FIGS. 1A-1C, the axes of the recessed portions 31, 32, 41, 42 extend approximately parallel to the axis of the passage 10 regardless of the position of the valve 2. Thus, regardless of the position of the valve 2, the intake air flow introduced into the intake port after passing through the plurality of sub-apertures 6, 7 results in a strong sub-intake flow (with a high flow rate and a high pressure), which generates a vortex of the intake air which has passed through the main aperture 3, thus making it possible to counter the return air occurring in the intake port downstream (close to the engine) from the intake flow control valve 2 in the axis direction of the intake passage 10 (the direction of the intake flow).

As compared with the intake vortex generator described in JP-A-2003-293775 having the sub-apertures 123 formed in the intake flow control valve 105, the valve 2 of the embodiment of FIGS. 1A-1C is more robust because it includes less apertures. Thus, the valve 2 can be made thinner to reduce weight, size, and material costs, and the valve 2 can be made with lower strength materials to thereby reduce manufacturing costs.

Second Embodiment

Figure 2:
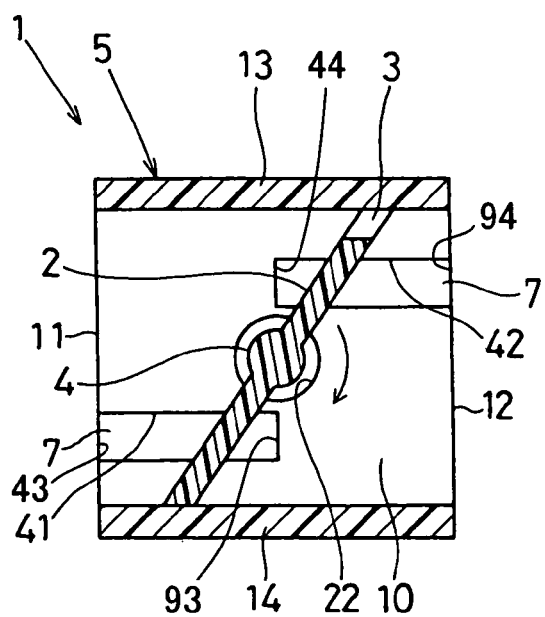
FIG. 2 is a sectional side view of the vortex generator according to a second embodiment.

Referring now to FIG. 2, a second embodiment of the present disclosure is illustrated. Components that correspond with those of the embodiment of FIGS. 1A-1C are numbered in a corresponding manner.

In the embodiment shown, the housing 5 includes a first recessed portion 41 that extends from the entrance of the passage 10 to an area adjacent the valve 2 when the valve 2 is in the fully closed position. The housing 5 also includes a second recessed portion 42 that extends from the exit of the passage 10 to an area adjacent, the valve 2 when the valve 2 is in the fully closed position. It will be appreciated that only one side wall of the housing 5 is shown, but that the opposite side wall of the housing 5 includes a similar first and second recessed portion 31, 32. The first recessed portions 31, 41 are provided on one side of the shaft 4 (e.g., below the shaft 4), and the second recessed portions 32, 42 are provided on an opposite side of the shaft 4 (e.g., above the shaft 4). The recessed portions 31, 32, 41, 42 each have a straight axis that is approximately parallel to the axis of the passage 10.

As stated, the first recessed portions 31, 41 have a start point 43 located at the entrance 11 of the passage 10. The end point 93 of the first recessed portions 31, 41 are located adjacent the valve 2 when the valve 2 is in the fully closed position. More specifically, the end point 93 of the first recessed portions 31, 41 are slightly downstream of the valve 2 when the valve 2 is in the fully closed position. Also, the second recessed portions 32, 42 have a start point 44 located slightly upstream of the valve 2 when the valve 2 is in the fully closed position. The end point 94 of the second recessed portions 32, 42 have an end point located at the exit of the passage 10. As a result, the plurality of sub-apertures 7 are formed between the recessed portions 31, 32, 41, 42 of the housing 5 and the valve 2 allow fluid flow therethrough when the valve 2 is in the fully closed position and the intermediate position.

Accordingly, as in the case of the first embodiment, in the intake vortex generator (valve unit 1) of the second embodiment, over the valve operating range from the fully closed position of the intake flow control valve 2 to the intermediate position, the strong sub-intake flow passing through the plurality of the sub-apertures 7 is capable of countering return air occurring in the intake port to thereby reduce the occurrence of a liquid pool of fuel near the intake flow control valve 2. Furthermore, the valve 2 is more robust and can be more economically manufactured.

Third Embodiment

FIGS. 3A to 4B illustrate a third embodiment of the present invention, wherein components similar to the embodiments discussed above are numbered in a corresponding manner.

In this embodiment, the valve shaft 4 is offset from the center of the valve 2. In other words, the valve shaft 4 is provided at a rotational end 91 of the valve opposite from a free end 92 of the valve 2. The rotational end 91 of the valve 2 is adjacent the bottom wall face (the lower end in FIG. 3A) and spaced away from the axis of the intake passage 10. The rotational end 91 of the valve 2 is also offset so as to be closer to the entrance 11 of the passage 10 than the exit 12 of the passage 10 and also an offset position closer to the upstream end in the axis direction of the intake passage 10 than the center of the intake passage 10. In other words, the valve shaft 4 is placed near the entrance of the housing 5 and close to the bottom wall face of the bottom wall 14 of the housing 5. For this reason, the intake flow control valve 2 is a single ended valve having the valve shaft 4 constituting the rotational center on the opposite end to the free end.

Furthermore, when the intake flow control valve 2 is in the fully closed position, the valve 2 is inclined at a positive, acute angle, α, relative to the axis of the passage 10.

Figure 3A:
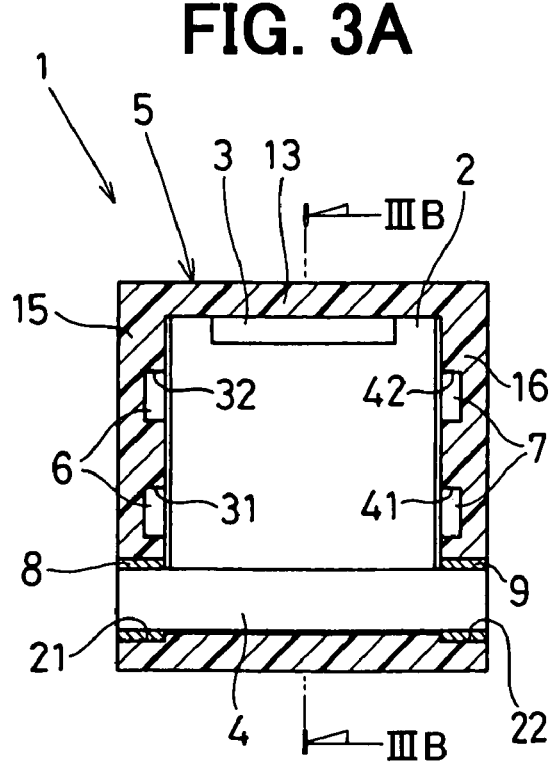
FIG. 3A is a sectional front view of the vortex generator according to a third embodiment.
Figure 3B:
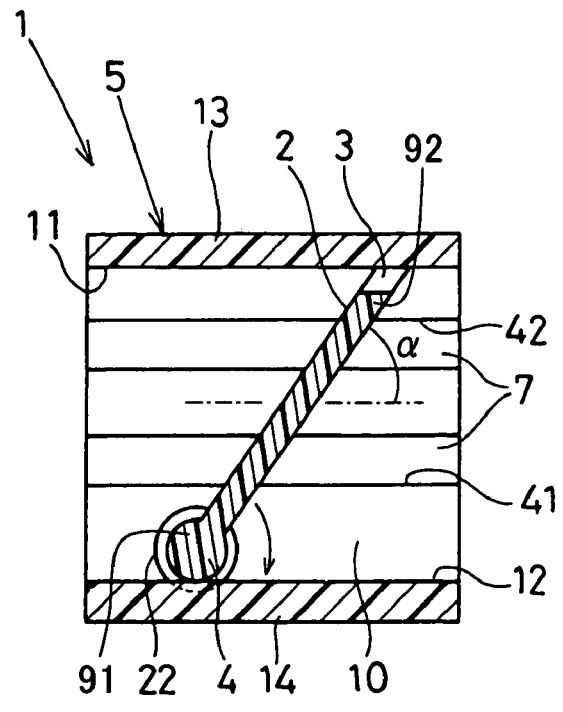
FIG. 3B is a sectional side view taken along the IIIB-IIIB line of FIG. 3A.
Figure 3C:
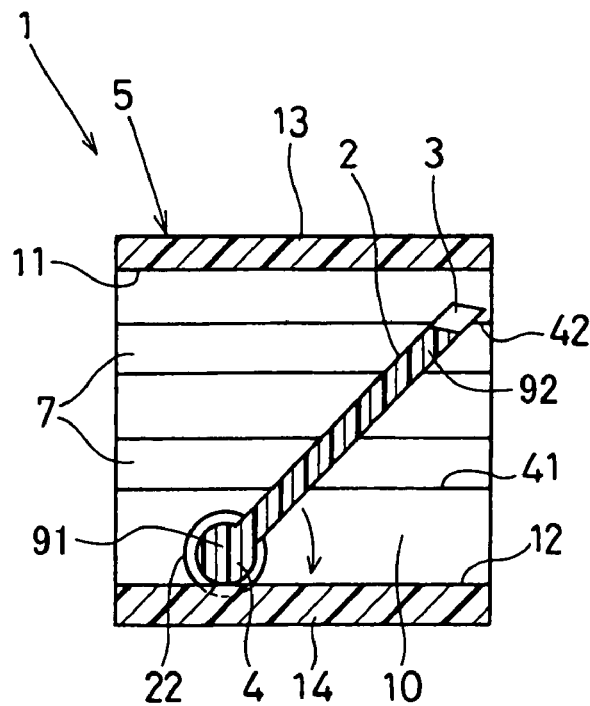
FIG. 3C is a sectional side view of the vortex generator of FIG. 3A with a valve shown in an intermediate position.

In this third embodiment, when a large amount of intake air is required, that is, when the engine is operated at low rpm, the intake flow control valve 2 is controlled to move from the fully closed position to the intermediate position as illustrated in FIG. 3C. When the engine runs at intermediate or high rpm, the intake flow control valve 2 is fully opened. Specifically, when the intake flow control valve 2 is fully opened to the fully open position, the intake flow control valve 2 is positioned such that the front and rear faces (of the plate-shaped valve body) extend in approximately the same direction as the axis direction of the intake passage 10.

The shaft receiving holes 21, 22 respectively formed in the two side walls 15, 16 of the housing in the third embodiment are placed in offset positions closer to the bottom wall (the lower side in FIG. 3A) than the axis of the intake passage 10, and also in offset positions closer to the entrance 11 of the passage 10 than the exit 12 of the passage 10. In other words, the two shaft receiving holes 21, 22 are placed in the positions near the entrance of the housing 5 and close to the bottom wall face (lower face in FIG. 3A) of the bottom wall 14 of the housing 14.

A plurality of sub-apertures 6, 7 are formed between the left end face of the intake flow control valve 2 and the recessed portions 31, 32, 41, 42 of the housing. As in the case of the first embodiment, the sub-apertures 6, 7 offer a strong sub-intake flow having the effect of countering the return air of the main intake flow over the valve operating range from the fully closed position of the intake flow control valve 2 to the intermediate position.

Furthermore, the first recessed portions 31, 41 are located between the valve shaft 4 and the second recessed portions 32, 42. More specifically, the two parallel first and second recessed portions 31, 32 and the two parallel first and second recessed portions 41, 42 are placed in the respective portions of the side-wall inner-faces of the two side walls 15, 16 above the valve shaft 4 and the shaft receiving holes 21, 22 in FIG. 3A (in the direction of the top wall). The first recessed portions 31, 41 respectively formed in the side walls 15, 16 of the housing 5 are positioned closer to the valve shaft 4 than the respective second recessed portions 32, 42. The second straight recessed portions 32, 42 respectively formed in the side walls 15, 16 of the housing 5 are positioned farther from the valve shaft 4 than the respective first straight recessed portions 31, 41 are positioned.

Figure 4A:
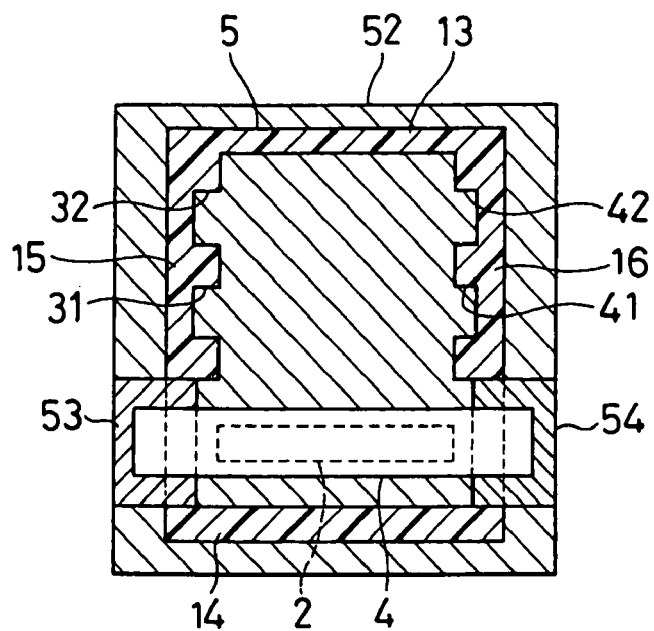
FIGS. 4A and 4B are sectional views of the vortex generator of FIG. 3A shown in a molding die.
Figure 4B:
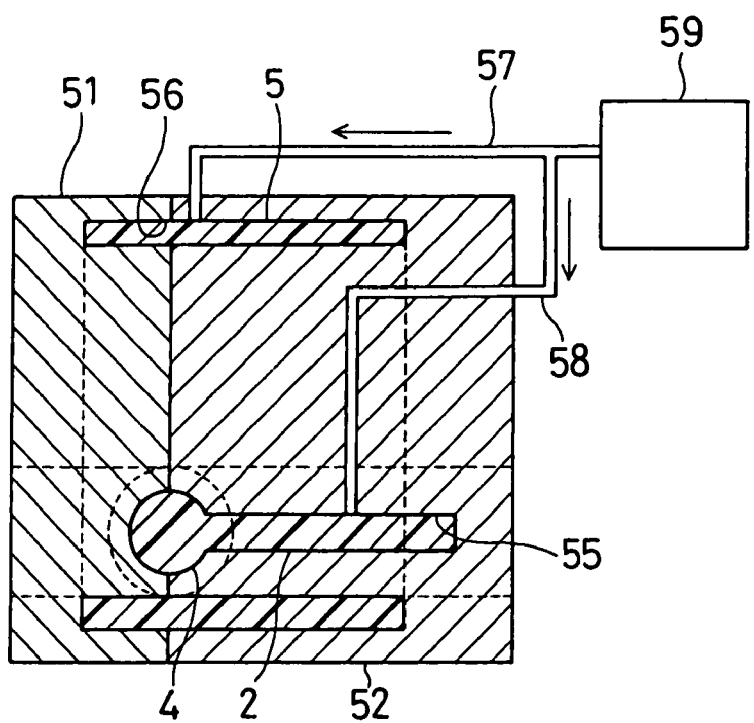

One embodiment of a molding process is illustrated in FIGS. 4A and 4B. As shown, the valve 2, the valve shaft 4, and the housing 5 are molded simultaneously within molding dies (i.e., injection mold). To remove the dies, the dies are moved along the direction of the axis of the passage 10 and the axes of the first and second recessed portions 31, 32, 41, 42.

The dies used in the third embodiment include a plurality of split slide cores 51-54. Cavities 55, 56 are provided inside the split slide cores 51-54. The cavity 55 has a shape corresponding to the product shape of the intake flow control valve 2 with the valve shaft 4. The cavity 56 has a shape corresponding to the product shape of the housing 5 having the intake passage 10 and the two shaft receiving holes 21, 22 formed therein. The injection mold is connected to a resin-material feeder 59 for feeding pellets of the resin material through a plurality of resin feeding lines 57, 58 into the cavities 55, 56.

The structure of the valve unit 1 of the third embodiment enables the simultaneous molding (integral molding of resin) of the intake flow control valve 2, the valve shaft 4 and the housing 5. As shown in FIGS. 4A and 4B, in the process of simultaneously molding the intake flow control valve 2, the valve shaft 4 and the housing 5, the intake flow control valve 2 is positioned to extend approximately parallel to the axis of the passage 10 (i.e., in the fully open position). Then, the split slide cores 51, 52 of the injection mold are removed away from each other in the axial direction in order to remove the dies.

The valve unit 1 as described in the third embodiment is formed by the use of the injection molding method. The pellets of the resin material are injected into the injection mold via a plurality of resin feeding lines 57, 58 from the resin material feeder 59. The pellets of the resin material are heated so as to melt and are pressured for injection into the injection mold. Specifically, a melted resin (a thermoplastic resin melted by being heated) is injected from the resin material feeder 59 through a plurality of resin feeding lines 57, 58 into an injection mold to fill the cavities 55, 56 (process of injecting and filling).

Next, the pressure is maintained at the internal die resin pressure exceeding a maximum internal die resin pressure at the time of gradually increasing the internal die resin pressure for injection. Specifically, a predetermined pressure is applied to the melted resin in the injection mold, then cooling water is introduced into a cooling channel (not shown) provided around the cavities 55, 56, and then the amount of melted resin corresponding to the degree of shrinkage caused by the cooling water is added to the cavities 55, 56 through a plurality of the resin feeding lines 57, 58 from the resin material feeder 59 (process of maintaining pressure). Then, after the melted resin has been cooled and set (solidified) by the use of cooling water, the injection mold is removed. Thus, the resin molding (thermoplastic resin product) of a product shape in which the intake flow control valve 2 and the valve shaft 4 are rotatably mounted in the housing 5 is manufactured by the simultaneous molding of the intake flow control valve 2, the valve shaft 4 and the housing 5.

In the case of the injection molding method as described above, the valve shaft 4 is molded in the intake flow control valve 2 while extending out from the right and left end faces of the intake flow control valve 2 in the axis direction and being rotatably held in the shaft receiving holes 21, 22 of the housing 5. Further, the plurality of recessed portions 31, 41, 32, 42 are also formed in the side faces of the two side walls 15, 16 of the housing 5 at the time of simultaneously molding the intake flow control valve 2, the valve shaft 4 and the housing 5.

Thus, the intake vortex generator (valve unit 1) of the third embodiment can be manufactured more easily. Accordingly, the manufacturing costs of the intake vortex generator (valve unit 1) are reduced. In addition, the intake vortex generator of the third embodiment is able to achieve the same effects as those in the first and second embodiments.

Fourth Embodiment

Figure 5:
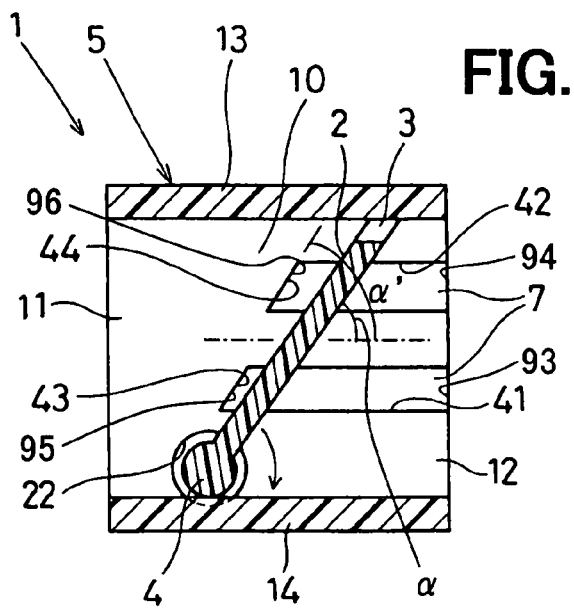
FIG. 5 is a sectional side view of the vortex generator according to a fourth embodiment.

Referring now to FIG. 5, another embodiment is shown, wherein components similar to those described above are similarly numbered. In this embodiment, the housing 5 includes an axially straight first recessed portion 41 and an axially straight second recessed portion 42. The first and second recessed portions 41, 42 are substantially parallel to each other and to the axis of the passage 10. The first recessed portion 41 is located between the shaft 4 and the second recessed portion 42.

An end point 93, 94 of each of the first and second recessed portions 41, 42 is located at the exit of the passage 10. A start point 43, 44 of each of the first and second recessed portions 41, 42 is located adjacent the valve 2 when the valve 2 is in the fully closed position. More specifically, the start point 43, 44 of each of the first and second recessed portions 41, 42 is located slightly upstream of the valve 2 when the valve 2 is in the fully closed position.

As shown in FIG. 5, when being fully closed, the intake flow control valve 2 is inclined at a positive, acute angle, α, relative to the axis of the passage 10. The angle of inclination, α, is such that the valve 2 is inclined relative to the shaft 4 toward the fully open direction. Also, the first and second recessed portions 41, 42 are staggered in an offset arrangement in which the starting point 44 of the second recessed portion 42 is located closer to the exit of the passage 10 than the starting point 43 of the first recessed portion 41.

Furthermore, the start point 43, 44 of the first and second recessed portions 41, 42 each include an inclined portion 95, 96. The inclined portion 95, 96 are inclined at a positive, acute angle, α', relative to the axis of the passage 10. In one embodiment, the angle of incline, α', of the inclined portions 95, 96 is approximately equal to the angle of incline, α, of the valve 2 when the valve is in the fully closed position.

In one embodiment, the flow control valve 2, the valve shaft 4, the housing 5, and the first and second recessed portions 41, 42 are simultaneously formed in a molding operation similar to the embodiment described above.

Accordingly, as in the case of the first embodiment, in the intake vortex generator (valve unit 1) of the fourth embodiment, the strong sub-intake flow is produced over the valve operating range, thus making it possible to ensure the effect of countering the return air flow of the main intake flow. Also, it is possible to provide an intake flow control valve 2 with a high degree of reliability at low costs. It is appreciated that the first and second recessed portions 31, 32 provided in the side wall 15 of the housing 5 described in the third embodiment, may be formed similar to the two first and second recessed portions 41, 42 provided in the side wall 16 of the housing 5 in the fourth embodiment.

Fifth Embodiment

Figure 6A:
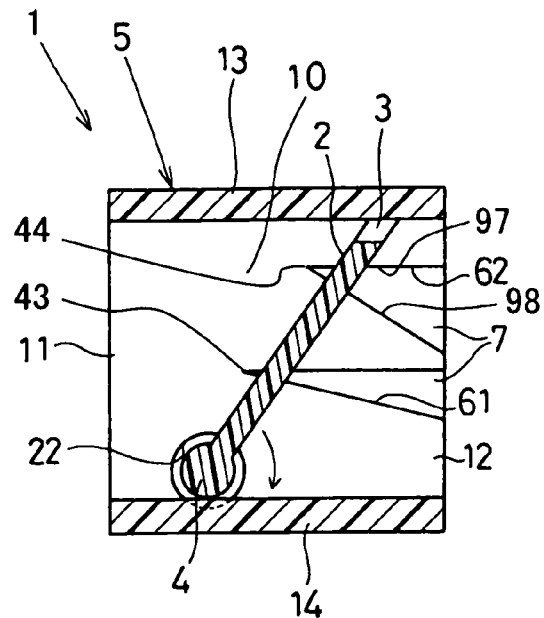
FIGS. 6A and 6B are sectional side views of the vortex generator according to a fifth embodiment.
Figure 6B:
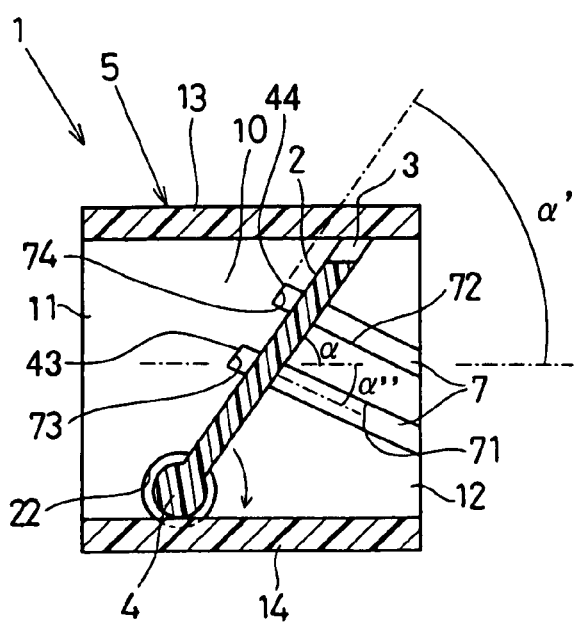

Referring now to FIGS. 6A and 6B, a fifth embodiment is illustrated, wherein components similar to those described above are indicated with similar numbering.

As shown in FIG. 6A, the recesses in the side wall 16 of the housing 5 of the fifth embodiment include first and second recessed portions 61, 62 that are triangular in shape (i.e., triangular grooves). The first recessed portion 61 is located between the valve shaft 4 and the second recessed portion 62. The recessed portions 61, 62 extend from a location adjacent (e.g., slightly upstream) of the valve 2 when the valve is in the fully closed position to the exit 12 of the passage 10. The width of the recessed portions 61, 62 increases in a downstream direction of the passage 10. Also, the width of the recessed portions 61, 62 increases toward the bottom wall of the housing 5.

Specifically, each recessed portion 61, 62 has an upper side 97 extending approximately parallel to the axis of the passage 10. Each recessed portion 61, 62 also has a hypotenuse side 98 extending in a straight line inclined toward the bottom wall (downward in the vertical direction) with respect to the upper side. In the embodiment shown, the angle of inclination of the hypotenuse of the second recessed portion 62 is greater than that of the first recessed portion 61. As shown in FIG. 6A, when the intake flow control valve 2 is fully closed, the intake flow control valve 2 is positioned in such a way as to be slightly inclined relative to the axis of the passage 10 toward the fully open position of the valve 2. For this reason, the first and second triangular recessed portions 61, 62 are staggered in an offset arrangement in which the starting point 44 of the second recessed portion 62 is located closer to the exit 12 of the housing 5 than the location of the starting point 95 of the first recessed portion 61.

Thus, the valve unit 1 includes a plurality of sub-apertures 7, which are formed between the right end face of the intake flow control valve 2 and the recessed portions 61, 62 of the housing 5. The sub-apertures provide fluid communication between an area upstream of the valve 2 and downstream of the valve 2 over the range of movement of the valve 2.

In the process of simultaneously molding the intake flow control valve 2, the valve shaft 4 and the housing 5, the first and second recessed portions 61, 62 extend in approximately the same direction (toward the upstream end) as the direction of removing the forming die, when the forming die is removed from the downstream end in the axis direction of the intake passage 10. Thus, the injection molding method described in the third embodiment can be used to integrally mold the intake flow control valve 2, the valve shaft 4 and the housing 5.

Accordingly, as in the case of the first embodiment, in the intake vortex generator (valve unit 1) of the fifth embodiment, the strong sub-intake flow is produced over the entire range of movement of the valve 2 (i.e., the valve operating range), thus making it possible to counter the return air flow of the main intake flow. In particular, the hypotenuse 98 of each of the first and second recessed portions 61, 62 extends with an inclination toward the bottom wall of the housing 5 with respect to the axis direction of the intake passage 10. This makes it possible to send the strong sub-intake flow toward the bottom in the vertical direction where the liquid pool of fuel is more likely to occur. As a result, the fuel is effectively pushed back toward the engine (the intake port and the combustion chamber) from the intake passage 10 of the housing 5. Also, it is possible to provide an intake flow control valve 2 with a high degree of reliability at low costs. It will be appreciated that, although the side wall 15 of the housing 5 is not shown, the side wall 15 may also have triangular first and second recessed portions 61, 62 similar to the first and second recessed portions 61, 62 shown in FIG. 6A.

Referring now to FIG. 6B, the side wall 16 of the housing 5 of the fifth embodiment includes two parallel first and second inclined recessed portions 71, 72 (i.e., grooves). The first and second recessed portions 71, 72 each extend parallel to each other and in a straight line toward the exit 12 of the housing 5 from a position adjacent to the intake flow control valve 2 when the valve 2 is in the fully closed position to the exit 12 of the passage 10. More specifically, the start point 43, 44 of the recessed portions 71, 72 are located slightly upstream of the valve 2. The axis of the first and second recessed portions 71, 72 are inclined at an acute, positive angle α" with respect to the axis of the passage 10 toward the bottom wall 14 of the housing 5. The first and second recessed portions 71, 72 are located in the side-wall inner-face of the side wall 16 above the valve shaft 4 and the shaft receiving holes 21, 22 (closer to the top wall) in FIG. 6B. The first inclined recessed portion 71 is located closer to the valve shaft 4 than the location of the second inclined recessed portion 72, and the second inclined recessed portion 72 is located farther from the valve shaft 4 than the location of the first inclined recessed portion 71. In other words, the first recessed portion 71 is located between the shaft 4 and the second recessed portion 72.

As shown in FIG. 6B, when the intake flow control valve 2 is in the fully closed position, the intake flow control valve 2 is inclined at a positive, acute angle α relative to the axis of the passage 10 toward the fully open position. The two first and second recessed portions 71, 72 are staggered in an offset arrangement such that the starting point 44 of the second recessed portion 72 is located closer to the exit 12 of the housing 5 than the starting point 43 of the first recessed portion 71. Furthermore, the starting points 43, 44 of the recessed portions 71, 72 include respective inclined portions 73, 74 that are inclined at a positive, acute angle, α', relative to the axis of the passage 10. The angle of inclination, α', of the inclined portions 73, 74 is approximately equal to the angle of inclination, α, of the valve 2 when the valve 2 is in the fully closed position.

Thus, the valve unit 1 of FIG. 6B includes a plurality of sub-apertures 7 formed between the right end face of the intake flow control valve 2 and the recessed portions 71, 72 of the housing 5. The sub-apertures 7 fluidly communicate an upstream side of the valve 2 to a downstream side of the valve 2 over the range of movement of the valve 2.

Accordingly, as in the case of the first embodiment, in the intake vortex generator (valve unit 1) of the fifth embodiment, the strong sub-intake flow is produced over the valve operating range, thus making it possible to counter the return air flow of the main intake flow. In particular, the first and second recessed portions 71, 72 extend with an inclination toward the bottom wall 14 of the housing 5 (downward in the vertical direction) with respect to the axis of the intake passage 10. This makes it possible to send the strong sub-intake flow toward the bottom area in the vertical direction where the liquid pool of fuel is apt to occur. As a result, the fuel is effectively pushed back toward the engine (the intake port and the combustion chamber) from the intake passage 10 of the housing 5. Also, it is possible to provide an intake flow control valve 2 with a high degree of reliability at low costs. Although not shown, it is appreciated that the side wall 15 of the housing 5 may have first and second recessed portions 71, 72 similar to those shown in FIG. 6B.

MODIFIED EXAMPLES

In the foregoing embodiments, the intake vortex generator according to the present invention is designed to generate a vertical intake vortex (tumble) for promoting the combustion of the air-fuel mixture in the combustion chamber in each of the cylinders of the engine body. Alternatively, the intake vortex generator according to the present invention may be designed to generate a horizontal intake vortex (swirl) for promoting the combustion of the air-fuel mixture in the combustion chamber in each of the cylinders of the engine body. Still alternatively, the intake vortex generator according to the present invention may be designed to generate a squish vortex for promoting the combustion of the engine.

In the embodiments, the valve drive device driving the intake flow control valve 2 of the valve unit 1 to the closed (open) position is composed of an electrically operated actuator provided with a power unit including an electrically operated motor and a power transmission mechanism (e.g., a gear reduction mechanism). Alternatively, the valve drive device driving the valve to the closed/open position may be composed of an electromagnetic actuator or a negative-pressure operated actuator including an electromagnetic or electrically operated negative-pressure control valve. The valve biasing member such as a spring for biasing the valve in the direction of opening or closing may not be provided.

In the embodiments, the intake vortex generator of the present invention is mounted in the intake system (or exhaust system) of an inline 4-cylinder engine with cylinders arranged in series. Alternatively, the intake vortex generator of the present invention may be mounted in the intake system (or exhaust system) of an internal combustion engine with cylinders arranged in a plurality of banks. Such an internal combustion engine includes a multi-cylinder engine such as a V engine, a horizontal engine and a horizontally opposed engine. The two bearings 8, 9 are formed of resin in the embodiments. Alternatively, two first and second bearing components may be made of metal. The valve is not limited to a multiple integral type intake flow control valve. Provided that the valve is an intake flow control valve integrally combined with a valve shaft, either a single-ended intake flow control valve or a double-ended intake flow control valve can be used.

The embodiments employ a normally closed type intake flow control valve, in which the intake flow control valve 2 is opened by passing an electric current through the electrically operated motor during the normal operation of the engine, and the intake flow control valve 2 is closed by stopping the application of electric current to the electrically operated motor when the engine is started or is idling. Alternatively, a normally opened type intake flow control valve may be employed, in which the intake flow control valve 2 is opened by stopping the application of electric current to the electrically operated motor during the normal operation of the engine and the intake flow control valve 2 is closed by passing the electric current through the electrically operated motor when the engine is started or is idling.

A valve unit 1 may be provided in each of the cylinders (the four cylinders in the embodiments) of the engine. In this case, a tumble flow control valve unit is provided, which has a first, second, third and fourth valve units arranged in order from the leading end of a direction of insertion of a valve shaft into the intake manifold and a plurality of valve units 1 toward the other end of the direction. Specifically, the intake vortex generator results in an intake flow control valve module (multiple integral type intake flow control valve switching apparatus) which has a plurality of valve units 1, each of which has an openable and closable resin valve mounted in a resin housing, arranged in parallel in the axis direction of the valve shaft at regular intervals in a rectangular parallelepiped shaped casing which forms part of the intake manifold. The valve unit 1 of each embodiment may be incorporated in an intake duct (intake pipe), other than the intake manifold, or in an intake port of the engine.

In the embodiments, the two recesses are provided in the side-wall inner-face of each of the side walls 15, 16 of the housing 5. Alternatively, a recess or three recesses or more may be formed in the side-wall inner-face of each of the side walls 15, 16 of the housing 5. The recess may be formed either in the side-wall inner-face of the side wall 15 of the housing or in the side-wall inner-face of the side wall 16 of the housing 5. The front shape of the intake flow control valve 2 is a square or a rectangular shape in the embodiments, but the front shape of the intake flow control valve 2 may be a circular, an elliptic, an oval, or a polygonal shape. In this case, the shape of the intake passage 10 in the housing 5 is changed in accordance with the front shape of the intake flow control valve 2.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A vortex generator for flow of a fluid comprising:
   a housing that includes a passage through which the fluid flows; and
   a valve that is movably coupled to the housing between a fully closed position and a fully open position for changing flow of the fluid in the passage, wherein the valve includes an open portion that defines a main aperture for generating a vortex in the flow of the fluid, wherein the valve also has an intermediate position between the fully closed position and the fully open position, wherein:
   the housing further includes a recessed portion such that the recessed portion of the housing and the valve cooperate to define a sub-aperture through which the fluid flows when the valve is positioned in the intermediate position, and
   the passage includes an entrance through which the fluid enters the passage and an exit through which the fluid exits the passage, wherein the housing includes a first recessed portion that extends from the entrance to an area adjacent the valve when the valve is in the fully closed position, and wherein the housing includes a second recessed portion that extends from the exit to an area adjacent the valve when the valve is in the fully closed position.

2. A vortex generator for flow of a fluid comprising:
   a housing that includes a passage through which the fluid flows; and
   a valve that is movably coupled to the housing between a fully closed position and a fully open position for changing flow of the fluid in the passage, wherein the valve includes an open portion that defines a main aperture for generating a vortex in the flow of the fluid, wherein the valve also has an intermediate position between the fully closed position and the fully open position, wherein:
   the housing further includes a recessed portion such that the recessed portion of the housing and the valve cooperate to define a sub-aperture through which the fluid flows when the valve is positioned in the intermediate position, and
   the passage includes an entrance through which the fluid enters the passage and an exit through which the fluid exits the passage, and wherein the recessed portion extends from the exit to an area adjacent the valve when the valve is in the fully closed position, and further comprising:
   a shaft that rotationally couples the valve and the housing, wherein the housing includes a first recessed portion and a second recessed portion, and wherein the first recessed portion is provided between the shaft and the second recessed portion.

3. A vortex generator for flow of a fluid comprising:
   a housing that includes a passage through which the fluid flows; and
   a valve that is movably coupled to the housing between a fully closed position and a fully open position for changing flow of the fluid in the passage, wherein the valve includes an open portion that defines a main aperture for generating a vortex in the flow of the fluid, wherein the valve also has an intermediate position between the fully closed position and the fully open position, wherein:
   the housing further includes a recessed portion such that the recessed portion of the housing and the valve cooperate to define a sub-aperture through which the fluid flows when the valve is positioned in the intermediate position, and
   the passage includes an exit through which the fluid exits the passage, and wherein the recessed portion of the housing is triangular in shape and extends from the exit to an area adjacent the valve when the valve is in the fully closed position, wherein a width of the recessed portion increases in a downstream direction of the passage.

4. A vortex generator for flow of a fluid comprising:
   a housing that includes a passage through which the fluid flows; and
   a valve that is movably coupled to the housing between a fully closed position and a fully open position for changing flow of the fluid in the passage, wherein the valve includes an open portion that defines a main aperture for generating a vortex in the flow of the fluid, wherein the valve also has an intermediate position between the fully closed position and the fully open position, wherein:

the housing further includes a recessed portion such that the recessed portion of the housing and the valve cooperate to define a sub-aperture through which the fluid flows when the valve is positioned in the intermediate position, the recessed portion of the housing extends linearly at a positive acute angle with respect to an axis of the passage, and the passage includes an entrance through which the fluid enters the passage and an exit through which the fluid exits the passage, and wherein the recessed portion extends from the exit to an area adjacent the valve when the valve is in the fully closed position, and further comprising:

a shaft that rotationally couples the valve and the housing, wherein the housing includes a first recessed portion and a second recessed portion, and wherein the first recessed portion is provided between the shaft and the second recessed portion.

5. A vortex generator for flow of a fluid comprising:

a housing that includes a passage through which the fluid flows; and a valve coupled to the housing, the valve movable between a fully closed position and a fully open position, the valve changing flow of the fluid in the passage, the valve including a main aperture generating a vortex in the flow of the fluid, the valve having an intermediate position between the fully closed position and the fully open position, wherein:

the housing further includes a recessed portion such that cooperates with the valve to define a sub-aperture through which the fluid flows when the valve is positioned in the intermediate position, the passage includes an entrance through which the fluid enters the passage and an exit through which the fluid exits the passage, and the recessed portion extends from the exit to an area adjacent the valve when the valve is in the fully closed position, an axis of the recessed portion extending approximately parallel to an axis of the passage.

6. A vortex generator for flow of a fluid comprising:

a housing that includes a passage through which the fluid flows; and a valve that is movably coupled to the housing between a fully closed position and a fully open position for changing flow of the fluid in the passage, wherein the valve includes an open portion that defines a main aperture for generating a vortex in the flow of the fluid, wherein the valve also has an intermediate position between the fully closed position and the fully open position, wherein:

the housing further includes a recessed portion such that the recessed portion of the housing and the valve cooperate to define a sub-aperture through which the fluid flows when the valve is positioned in the intermediate position, and an axis of the recessed portion of the housing extends approximately parallel to an axis of the passage.

7. A vortex generator according to claim 6, wherein the sub-aperture provides fluid communication between an upstream side of the valve and a downstream side of the valve such that the fluid flows through the sub-aperture when the valve is in the closed position and the intermediate position.

8. A vortex generator according to claim 6, further comprising a shaft that rotationally couples the valve and the housing, wherein the shaft is provided at a rotational end of the of the valve opposite from a free end of the valve and defines a rotational center of the valve.

9. A vortex generator according to claim 6, wherein the passage includes an entrance through which the fluid enters the passage and an exit through which the fluid exits the passage, and wherein the recessed portion extends linearly from the entrance to the exit.

10. A vortex generator according to claim 6, wherein the passage includes an entrance through which the fluid enters the passage and an exit through which the fluid exits the passage, wherein the housing includes a first recessed portion that extends from the entrance to an area adjacent the valve when the valve is in the fully closed position, and wherein the housing includes a second recessed portion that extends from the exit to an area adjacent the valve when the valve is in the fully closed position.

11. A vortex generator according to claim 6, wherein the passage includes an exit through which the fluid exits the passage, and wherein the recessed portion of the housing is triangular in shape and extends from the exit to an area adjacent the valve when the valve is in the fully closed position, wherein a width of the recessed portion increases in a downstream direction of the passage.

12. A vortex generator according to claim 6, further comprising a shaft that rotationally couples the valve and the housing, wherein the shaft is provided approximately at a central portion of the valve and defines a rotational center thereof.

13. A vortex generator according to claim 12, wherein the housing includes a face that is curved according to the track of rotational movement of the valve.

14. A vortex generator according to claim 6, wherein the passage includes an entrance through which the fluid enters the passage and an exit through which the fluid exits the passage, and wherein the recessed portion extends from the exit to an area adjacent the valve when the valve is in the fully closed position.

15. A vortex generator according to claim 14, further comprising a shaft that rotationally couples the valve and the housing, wherein the housing includes a first recessed portion and a second recessed portion, and wherein the first recessed portion is provided between the shaft and the second recessed portion.

16. A vortex generator according to claim 15, wherein the first and second recessed portions each include an end point at the exit of the passage and a start point at the area adjacent the valve when the valve is in the fully closed position, and wherein the first and second recessed portions are staggered such that the start point of the second recessed portion is closer to the exit of the housing than the start point of the first recessed portion.

17. A vortex generator according to claim 16, wherein the valve is inclined at a positive, acute first angle with respect to an axis of the passage when the valve is in the fully closed position, and wherein the respective starting point of the first and second recessed portions each includes an inclined portion that is inclined at a positive, acute second angle relative to the axis of the passage, and wherein the second angle is approximately equal to the first angle.

18. A vortex generator according to claim 6, wherein the recessed portion of the housing extends linearly at a positive acute angle with respect to an axis of the passage.

19. A vortex generator according to claim 18, wherein the passage includes an entrance through which the fluid enters the passage and an exit through which the fluid exits the passage, and wherein the recessed portion extends from the exit to an area adjacent the valve when the valve is in the fully closed position.

20. A vortex generator according to claim 19, further comprising a shaft that rotationally couples the valve and the housing, wherein the housing includes a first recessed portion and a second recessed portion, and wherein the first recessed portion is provided between the shaft and the second recessed portion.

21. A vortex generator according to claim 20, wherein the first and second recessed portions each include an end point at the exit of the passage and a start point at the area adjacent the valve when the valve is in the fully closed position, and wherein the first and second recessed portions are staggered such that the start point of the second recessed portion is closer to the exit of the housing than the start point of the first recessed portion.

22. A vortex generator according to claim 21, wherein the valve is inclined at a positive, acute first angle with respect to an axis of the passage when the valve is in the fully closed position, and wherein the respective starting point of the first and second recessed portions each includes an inclined portion that is inclined at a positive, acute second angle relative to the axis of the passage, and wherein the second angle is approximately equal to the first angle.

* * * * *